Figure 1:
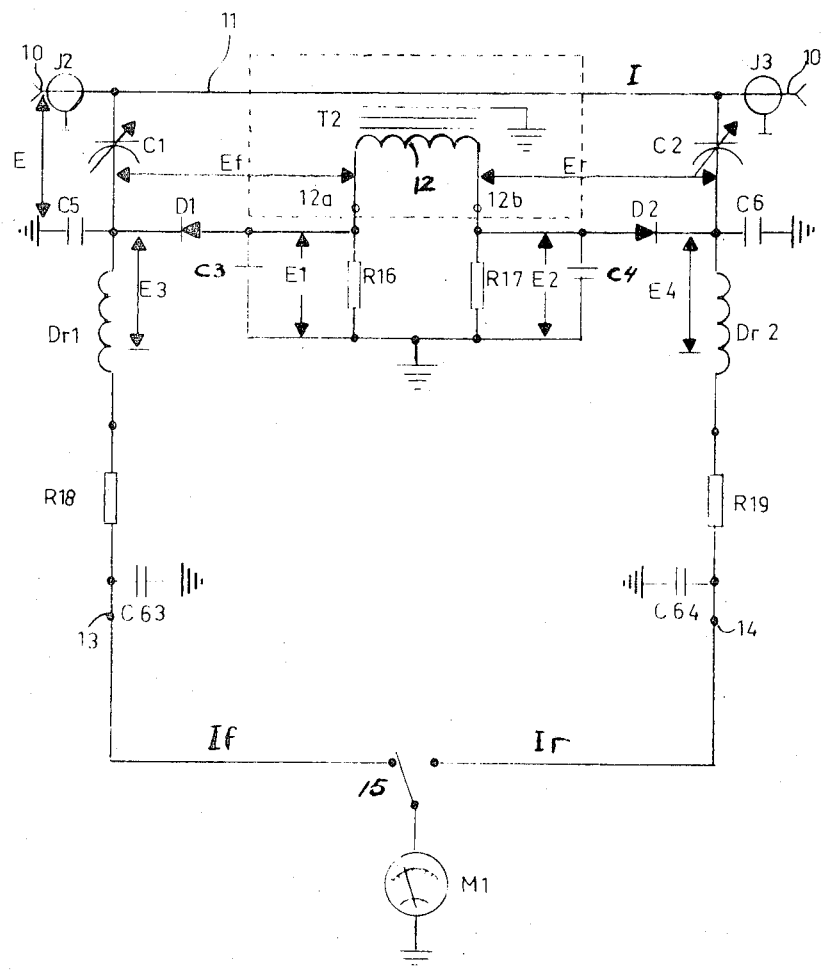

United States Patent [19]
Ramstrom

[11] 3,784,911
[45] Jan. 8, 1974

[54] DIRECTIONAL COUPLER FOR MEASURING FORWARD AND REFLECTED POWER COMPRISING A BORED METAL BLOCK

[75] Inventor: Sven Ramstrom, Lyckeby, Sweden

[73] Assignee: Karlskronavarnet AB, Karlskrona, Sweden

[22] Filed: Sept. 20, 1971

[21] Appl. No.: 181,775

[30] Foreign Application Priority Data
Sept. 21, 1970 Sweden.............................. 12806/70

[52] U.S. Cl...................... 324/95, 333/10, 333/84 R
[51] Int. Cl............................................ G01r 21/12
[58] Field of Search...................... 333/10, 97, 84 R; 324/95

[56] References Cited
UNITED STATES PATENTS
| | | | |
|---|---|---|---|
| 3,475,701 | 10/1969 | Puljer | 333/10 |
| 2,792,550 | 5/1957 | Backstrand | 333/10 |
| 3,243,704 | 3/1966 | Jarger et al. | 333/10 X |

FOREIGN PATENTS OR APPLICATIONS
| | | | |
|---|---|---|---|
| 250,954 | 5/1963 | Australia | 333/10 |

*Primary Examiner*—Paul L. Gensler
*Attorney*—Cushman, Darby & Cushman

[57] ABSTRACT

A directional coupler for measuring forward and reflected power in a high frequency transmission line, said coupler comprising a number of components arranged and fixed in a metal component block provided with bores for the separate components.

4 Claims, 4 Drawing Figures

3,784,911

DIRECTIONAL COUPLER FOR MEASURING FORWARD AND REFLECTED POWER COMPRISING A BORED METAL BLOCK

The present invention is related to a directional coupler for measuring forward and reflected power in a high-frequency feeder.

For measuring high-frequency power through a feeder to a load it is of great importance that the load is tuned to the feeder, i.e., that the load impedance is in accordance with the impedance of the feeder so that minimum power is reflected back from the load in a direction toward the source transmitting high-frequency power. The greater the differences are between the load impedance and the impedance of the feeder, the more power is reflected from the load. This reflected power of course causes that only a portion of the power available at the transmitter can be utilized in the load. The problem is of special importance in such cases wherein the load is tunable for various wave-lengths. If the matching between the aerial and the feeder is inferior, a high standing-wave ratio is obtained, which, consequently, involves an inferior efficiency of the aerial, so that only a portion of the high-frequency power available is transmitted into space.

In order to obtain a good impression of how the load is matched to the feeder it is therefore necessary during the performance of the feeding of high-frequency to the load to measure on one hand the forward power from the transmitter to the load and on the other hand the power reflected back from the load. At a correct tuning of the load the forward power will have a maximum value and the power reflected back will have a minimum value.

A plurality of types of such directional couplers are previously known. Since these directional couplers in most cases are used for very high frequencies, the requirements for electrical and mechanical stability are high. The requirements for electrical and mechanical stability will, in addition, be still higher, if the directional couplers are intended for use in connection with loads, preferably in the form of radio aerials, which are portable and during operation are exposed, to substantial stress in the form of shocks and vibrations and further must operate in a perfect manner even under severe environmental conditions, e.g., at sea.

The main object of the present invention is to provide a directional coupler, which is of extremely stable construction from both an electrical and a mechanical point of view and which can resist severe stress and severe environment for a long time.

This object is attained by providing the directional coupler of the present invention with the features defined in claim 1.

An embodiment of the invention will now be described below with reference to the accompanying drawings.

Figure 2:
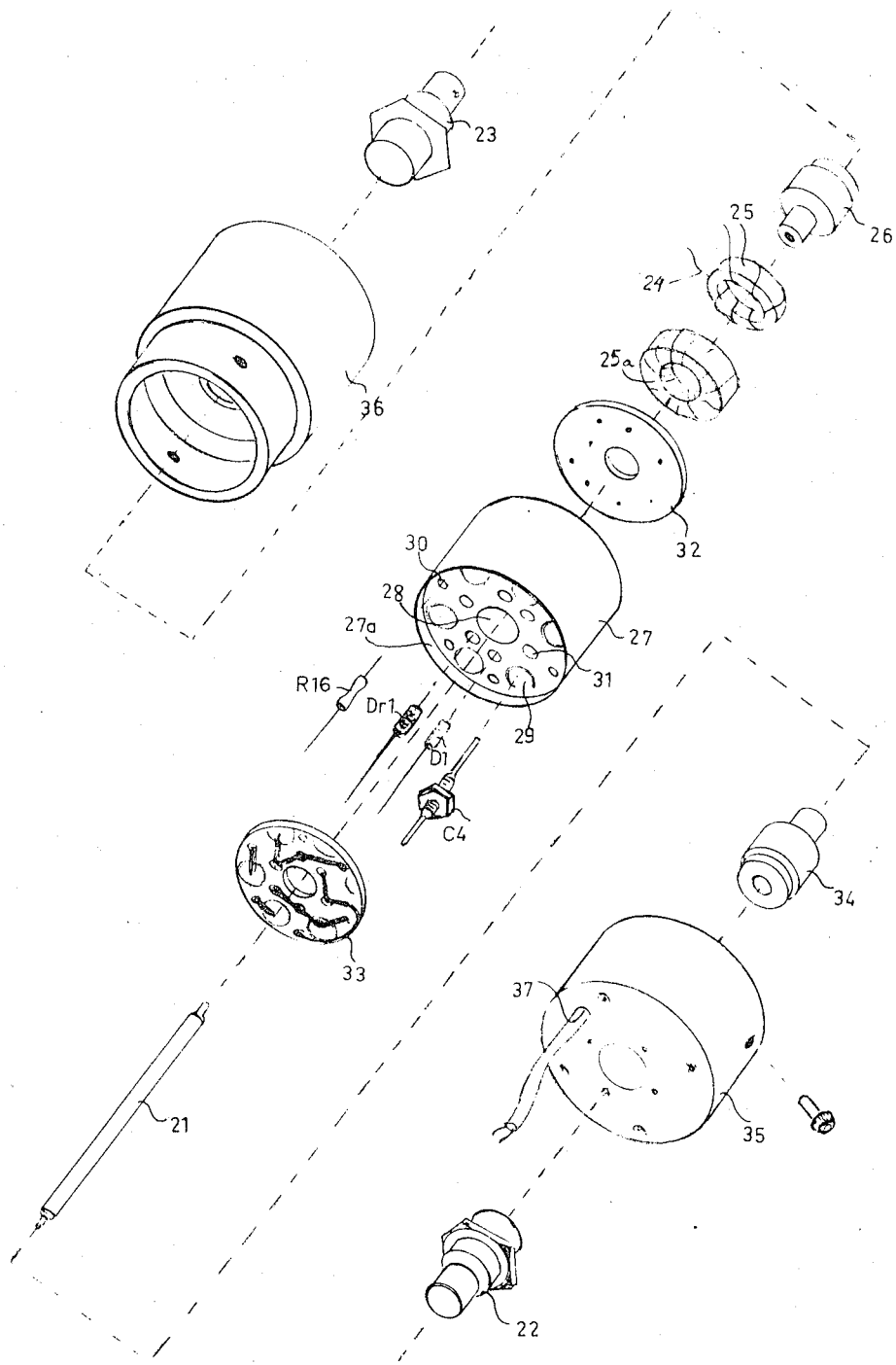
Figure 3:
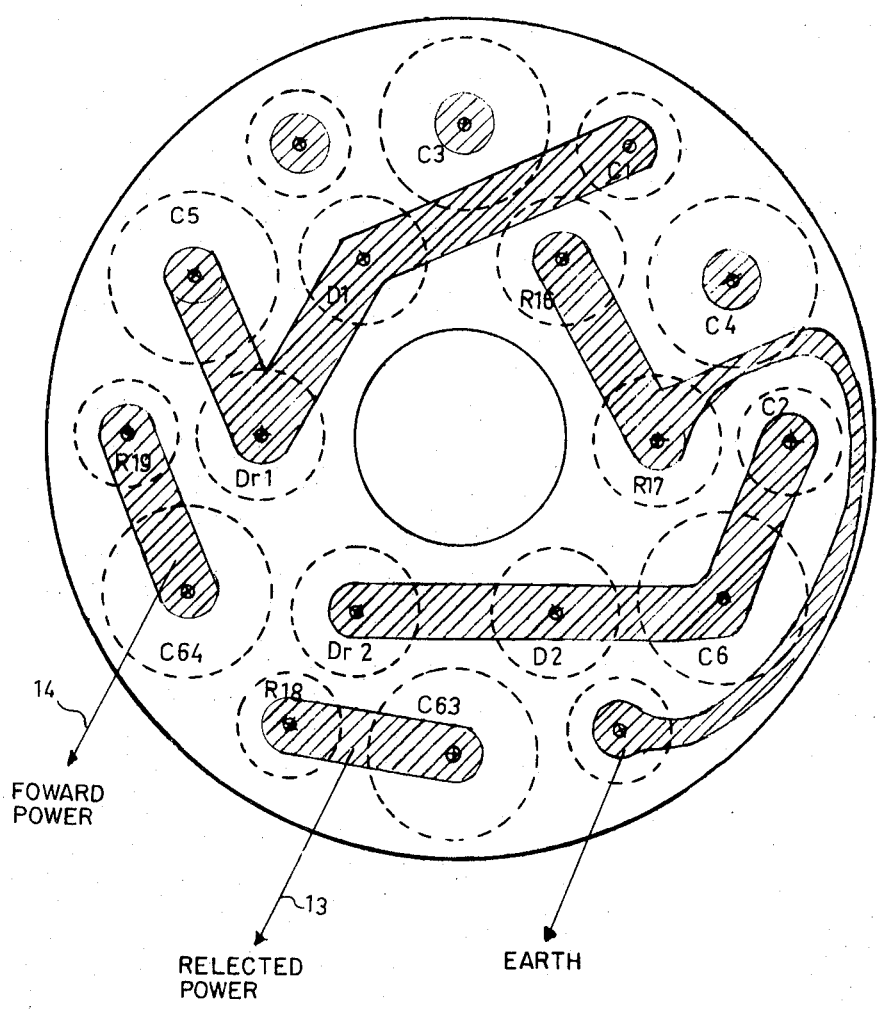
Figure 4:
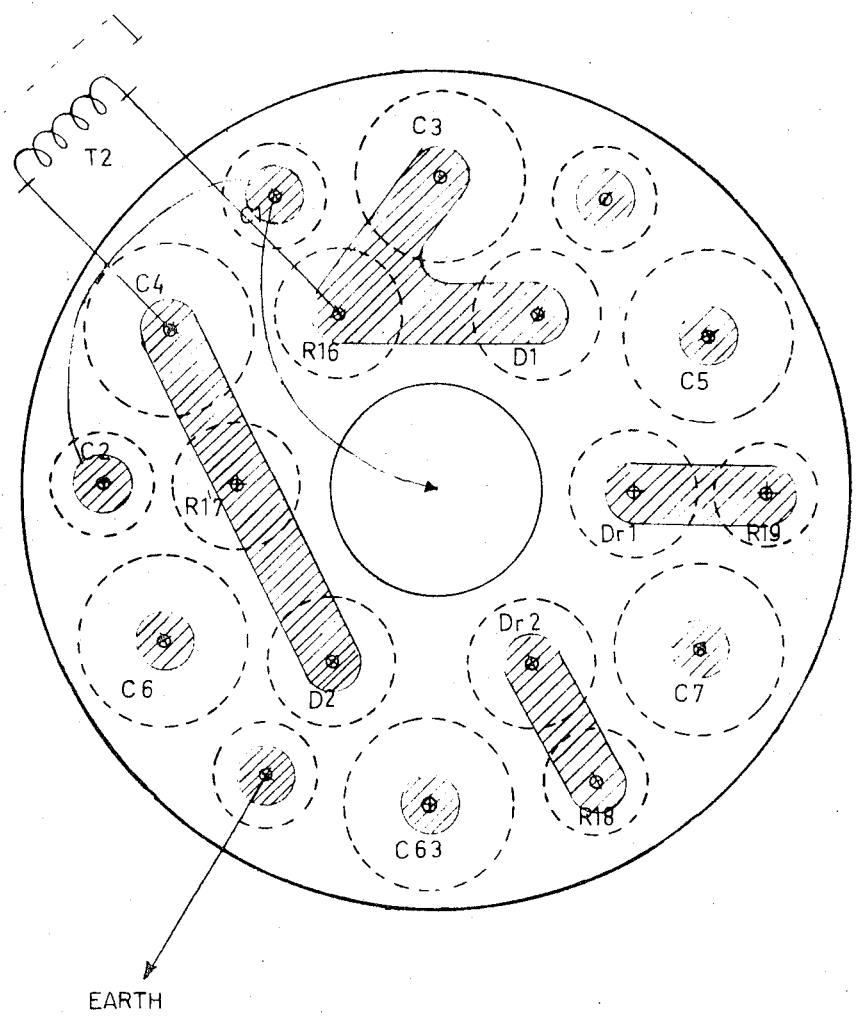

FIG. 1 shows the electric circuit diagram for a directional coupler,

FIG. 2 an exploded view of one embodiment of a directional coupler according to the invention, FIG. 3 a view from one side of a connection plate, which is used for the connection of the circuit components comprised in the directional coupler, and FIG. 4 a view from the other side of a second connection plate for the connection of the circuit components.

The circuit diagram illustrated in FIG. 1 of the directional coupler shows a high-frequency feeder 10 from a transmitter to a load. This feeder is preferably formed by a coaxial cable. At the connection terminals J2 and J3 the coaxial cable is connected to a conductor 11, which serves as a primary winding in a transformer T2, a coil 12 forming the secondary winding of the transformer. At its two ends 12a and 12b the coil 12 is connected to earth by means of resistors R16 and R17, respectively, and capacitors C3 and C4, respectively. Each coil end is further connected through one rectifier each D1 and D2, respectively, in the passage direction, one choke each Dr1 and Dr2, respectively, and one resistor each R18 and R19, respectively, to output terminals 13 and 14, respectively, from which the forward and the reflected power, respectively, in the high-frequency feeder 10 can be taken and fed to a measuring instrument M1 via a switch 15. The sides of the rectifiers D1 and D2, respectively, directed away from the coil ends, are connected by means of variable capacitors C1 and C2, respectively, to the conductor 11 serving as a primary winding and in addition connected to decoupling condensers C5 and C6, respectively, the other ends of which are connected to ground (not shown). Similarly, the output terminals 13 and 14 are decoupled to earth by means of capacitors C63 and C64, respectively.

FIG. 2 shows an embodiment of the directional coupler according to the present invention. The transformer T2 comprises on one hand a primary winding in the form of a silvered brass rod 21, in the ends of which coaxial connectors 22 and 23, respectively, are provided for the connection of the primary winding in the feeder consisting of a coaxial cable, and on the other hand a secondary winding 24, which is arranged on a ferrite core 25 surrounding the primary winding. The ferrite core 25 is maintained at a convenient distance from the primary winding by means of a spacing member 26 located in the aperture of the ferrite core and together with the secondary winding 24 enclosed by a copper shield 25a. By means of the coupling in the transformer between the primary and secondary windings of the transformer output, voltages are obtained between the ends of the secondary winding 24, these voltages corresponding to the forward and the reflected power. The components comprised in the electric circuit in the form of resistors, capacitors, choks and rectifiers are arranged in a cylindrically shaped component block 27 of metal, preferably a light metal, wherein a number of bores 28–31 have been provided. The component block 27 presents a central through bore 28 which is adapted to allow the passage of the primary winding and a number of through bores 29–31 arranged around said central bore, wherein the components of the circuit are adapted to be located. The bores in the component block are preferably parallel. On either side of said component block a circuit board is provided 32 and 33, respectively, supporting the electric conductors, which are required for interconnection and connection of the various components in the circuit. These circuit boards comprise an insulating plate, preferably of glass fibre reinforced plastic, whereon the various conductors have been located by a suitable method of producing printed circuits. The components comrised in the circuit are thus in an electrical respect connected between the conductors on the two circuit boards and in a mechnical respect arranged protected within the component block proper. The various components can then be pushed with a close fit into the bores in the component block or else securely screwed or in any other manner secured in the component block. It is also possible to mount small and light components by securing the terminal ends of the components to conductors on the circuit boards and allow the components to extend through the bores with a certain clearance.

The free ends of the capacitors C5, C6, C63 and C64 as shown in FIG. 1 are connected to the component block and earthed therethrough.

The component block 27 is maintained spaced from the primary winding 21 of the transformer by means of a spacing member 34.

The component block 27 and the two circuit boards 32 and 33 connecting the components in the component block and the ferrite core 25 are enclosed by a housing of light metal formed in two parts 35 and 36. In the ends of the housing the coaxial connectors 22 and 23 for connecting the primary winding of the transformer are located. The enclosing housing is provided with an aperture 37, through which the voltages corresponding to the forward and the reflected power can be taken and applied to a suitable measuring instrument M1.

FIG. 3 and 4 show in detail the circuit boards and the conductors thereon which are required for the connection and interconnection of the various components in the electric circuit. The central bore in the circuit boards is adapted to receive the primary winding of the transformer. The component block 27 is provided at both ends with an axially protruding edge 27a at its periphery, said edge surrounding the circuit boards and maintaining them in position. A guiding pin may also be provided on the component block, this pin extending into a bore or an aperture in the circuit board so as to more securely maintain the board in position and prevent erroneous mounting. After mounting the circuit boards are pressed against the component block by the enclosing housing 35, 36.

Since FIG. 3 and 4 show the circuit boards as seen from the ends of the component block, when they are mounted on the block, the bores indicated are shown as reflected images around the vertical axis in the illustrations. A bore, which in one of FIG. 3 and 4 is shown to the left of the vertical center line, will therefore be shown to the right of said center line in the other illustration.

Since the components comprised in the electric circuit are arranged in cavities in a light metal block, which in turn may be earthed, an extremely stable construction of the directional coupler from both an electrical and a mechanical point of view is obtained and, in addition, an excellent shielding of the complete device.

The directional coupler described operates in the following manner. The voltages mentioned below are indicated in the electric circuit diagram in FIG. 1. A current I flows through the feeder 21 through the center of the toroidal coil 25. The lead 21 forms a primary winding and the coil 24 a secondary winding in the toroidal transformer T2. Induced current in the secondary winding is present in the static shield 25a. Induced current in the secondary winding produces voltage, which is divided in two equal parts over the equal resistors R16 and R17, resulting in two equal voltages E1 and E2 over the resistors. Since the junction point between the resistors R16 and R17 is earthed, the voltages E1 and E2 are opposite in phase and proportional to the current I. The voltage E on the feeder is connected over two capacitve voltage dividers C1–C5 and C2–C6, resulting in two equal voltages E3 and E4 with equal phase.

When the feeder is mismatched, the voltages E1 and E2 represent the vector sum of two components, one of which is proportional to the current in the forward direction and the other of which is proportional to the reflected current. The voltages E3 and E4 represent the vector sum of the components of the forward and the reflected wave. The capacitances C1 and C2 are adjusted so that the amplitudes of the components of the forward voltage and current will be identical and so that also the reflected components will be equal.

The phase relation between the various components is such that the HF-voltage Ef across the rectifier D1 will be equal to the arithmetic sum of the two equal forward components, while the Hf voltage Er across the rectifier D2 will be equal to the arithmetic sum of the two reflected components.

The HF-voltages E1 and E2 are rectified and filtered by D1, D2, C5 and C6 to provide the DC If and Ir through the instrument M1. The measuring scale is calibrated in such a manner that If will produce a scale reading which is proportional to the forward power, while Ir porduces a scale reading which is proportional to the reflected power. The resistors R18 and R19 are selected in such a manner that If and Ir give an accurate indication of the power range. The accuracy on the HF-power meter is obtained over the frequency range 2.0–30 MHz on both the inductively and the capacitively coupled elements. In the inductive elements, the increase of the induced voltage with the frequency is neutralized by the voltage drop across the toroidal coil due to the increase of the inductive reactance with the frequency. In the directly coupled capacitive elements the ratio between the capacitive reactances in the voltage divider is constant, even if the reactances vary with the frequency. The capacitances C3 and C4 compensate the residual series inductance in the resistors R16 and R17.

The actual power is the output power from the transmitter. When a feeder is perfectly matched, the reflected power is zero and the actual power is equal to the forward power. When the feeder is mismatched, the phase relation between the components of the forward and the reflected wave causes the virtual forward power to be increased with the same value as the amplitude of the reflected power. Since the reflcted power counteracts a portion of the forward power, the actual power is equal to the difference between forward and reflected power, i.e., actual power = forward power − reflected power.

The directional coupler of the exemplary embodiment described above has been shown as matched to a coaxial line but it is evident that the directional coupler can also be used in connection with high-frequency lines of another type, e.g., wave guides. Also in connection with band cables the directional coupler can be used but the connection between the feeder and the electric circuit must then be modified in a suitable manner.

I claim:

1. A directional coupler for measuring forward and reflected power in a high-frequency feeder, comprising a coupling device deriving power from the feeder and transferring said power to an electric circuit, comprising lumped circuit elements and having two outputs, one supplying an electrical quantity corresponding to the forward power and the other supplying an electrical signal corresponding to the reflected power, said outputs being connected to a measuring instrument indicating the magnitude of said signal and said circuit elements being positioned in a metal block, said block being provided with a through hole for the feeder and a plurality of through holes for positioning the circuit elements, said last-mentioned holes extending through said block from one block surface to the other substantially parallel with said feeder hole, said block further being positioned between two circuit boards which abut respectively said block surfaces and which are provided with conductors for connecting said circuit elements.

2. A directional coupler as claimed in claim 1, in which the component block, the circuit boards and the coupling device for extracting power from the feeder are surrounded by a two-part shielding housing of metal.

3. A directional coupler according to claim 1, in which said through feeder hole is positioned centrally in the metal block and said circuit element holes are positioned around said central hole.

4. A directional coupler as claimed in claim 3, in which the metal block is centered on the feeder by means of a spacing member.

* * * * *